United States Patent [19]

Harlan

[11] Patent Number: 4,536,796
[45] Date of Patent: Aug. 20, 1985

[54] NON-LINEAR DYNAMIC CORING CIRCUIT FOR VIDEO SIGNALS

[75] Inventor: Wayne E. Harlan, Indianapolis, Ind.

[73] Assignee: RCA Corporation, Princeton, N.J.

[21] Appl. No.: 525,682

[22] Filed: Aug. 23, 1983

[51] Int. Cl.³ .......................... H04N 5/14; H04N 5/21
[52] U.S. Cl. ..................................... 358/166; 358/167
[58] Field of Search ................................ 358/166, 167

[56] References Cited

U.S. PATENT DOCUMENTS 4,437,123  3/1984  Harlan ................................. 358/166
4,437,124  3/1984  Cochran ............................. 358/166

FOREIGN PATENT DOCUMENTS 2118396  3/1983  United Kingdom .
2119601  4/1983  United Kingdom .

Primary Examiner—Michael A. Masinick
Assistant Examiner—E. Anne Toth
Attorney, Agent, or Firm—P. J. Rasmussen; P. M. Emanuel; R. H. Kurdyla

[57] ABSTRACT

In a television receiver, a horizontal peaking signal is added to a luminance signal to accentuate its horizontal detail. The peaking signal is subject to a coring action with the amount of coring subject to dynamic control as a function of luminance signal content. The sense of coring control is such that a greater amount of coring is associated with dark portions of a scene to be reproduced than is associated with bright portions thereof. The coring control is non-linear and exhibits one control characteristic over a first range of luminance signal levels between a white image limit and a threshold level in the black image direction, and a different control characteristic over a second range of signal levels between the threshold level and the black image limit for restricting the amount of coring produced as the black limit is approached.

6 Claims, 3 Drawing Figures

NON-LINEAR DYNAMIC CORING CIRCUIT FOR VIDEO SIGNALS

The present invention concerns a signal coring circuit for use with video signal peaking signal systems such as may be employed in television receivers to improve the detail of reproduced images. In particular, the invention concerns such a circuit for reducing the impact of noise upon a reproduced image without unduly degrading the detail of a reproduced image.

Coring of a signal serves to remove a close-to-average-axis "core" of the signal by processing the signal with a translating circuit having a transfer characteristic with a "dead zone" for close-to-axis signal excursions. Signal coring is a known signal processing function occasionally used for noise reduction purposes as explained, for example, in an article by J. P. Rossi entitled "Digital Techniques for Reducing Television Noise", appearing on pages 134–140 of the March, 1978 issue of the SMPTE Journal. Automatic adjustment of the amount of coring may be provided on a dynamic basis as shown for example in U.S. Pat. No. 4,167,749—Burrus, where the amount of coring is varied as a function of the level of noise detected in a video signal. In such system the amount of coring is relatively high when the detected noise level is high, to thereby enhance the signal-to-noise ratio. Conversely, less coring is provided when the detected noise level is low, to thereby minimize disturbance of desired signal amplitude variations.

In a copending U.S. patent application of L. A. Harwood, et al., Ser. No. 460,985 filed Jan. 25, 1983, now U.S. Pat. No. 4,441,121, and entitled "Adjustable Coring Circuit" (a continuation-in-part of patent application Ser. No. 363,868 filed Mar. 31, 1982 now abandoned), a video signal horizontal peaking system for a television receiver is disclosed wherein aparatus is included for providing adjustable coring of a horizontal peaking signal component to be added to the luminance component of a video signal for detail enhancement purposes. The coring of such a peaking signal component lessens the likelihood that undesired enhancement of background noise will accompany the desired picture detail enhancement.

In a copending U.S. patent application of L. Cochran, Ser. No. 373,750 filed Apr. 30, 1982, now U.S. Pat. No. 4,437,124 and entitled "Dynamic Coring Circuit" now U. S. Pat. No. 4,437,124, there is disclosed an approach to linear control of the coring of the horizontal peaking component in a system of the type disclosed in the aforementioned Harwood, et al. patent application. In accordance with the approach proposed by Cochran, variation of the amount of coring (i.e., the coring "depth") is linearly regulated as a function of the level of the low frequency content of luminance signals to be peaked, between black and white image limits. The sense of the linear dynamic control proposed by Cochran is such that maximum coring is effected at the black image limit and minimum coring is effected at the white image limit.

A dynamic coring control system disclosed herein corresponds to an improvement over the Cochran system wherein the sense of coring control is such that a greater amount of coring is associated with dark portions of a scene to be reproduced than is associated with light portions threof. In accordance with the principles of the present invention, the disclosed coring control system exhibits a non-linear control characteristic. The disclosed system exhibits one coring control characteristic over a range of video signal levels between the white image limit and a threshold level in the black image direction. A different control characteristic is exhibited over a second range of video signal levels between the threshold level and the black image limit for restricting the amount of coring produced as the black limit is approached. It has been found that relatively dark scenes reproduced by a television receiver incorporating the disclosed system are perceived by viewers as having improved image detail. In the drawing:

Figure 1:
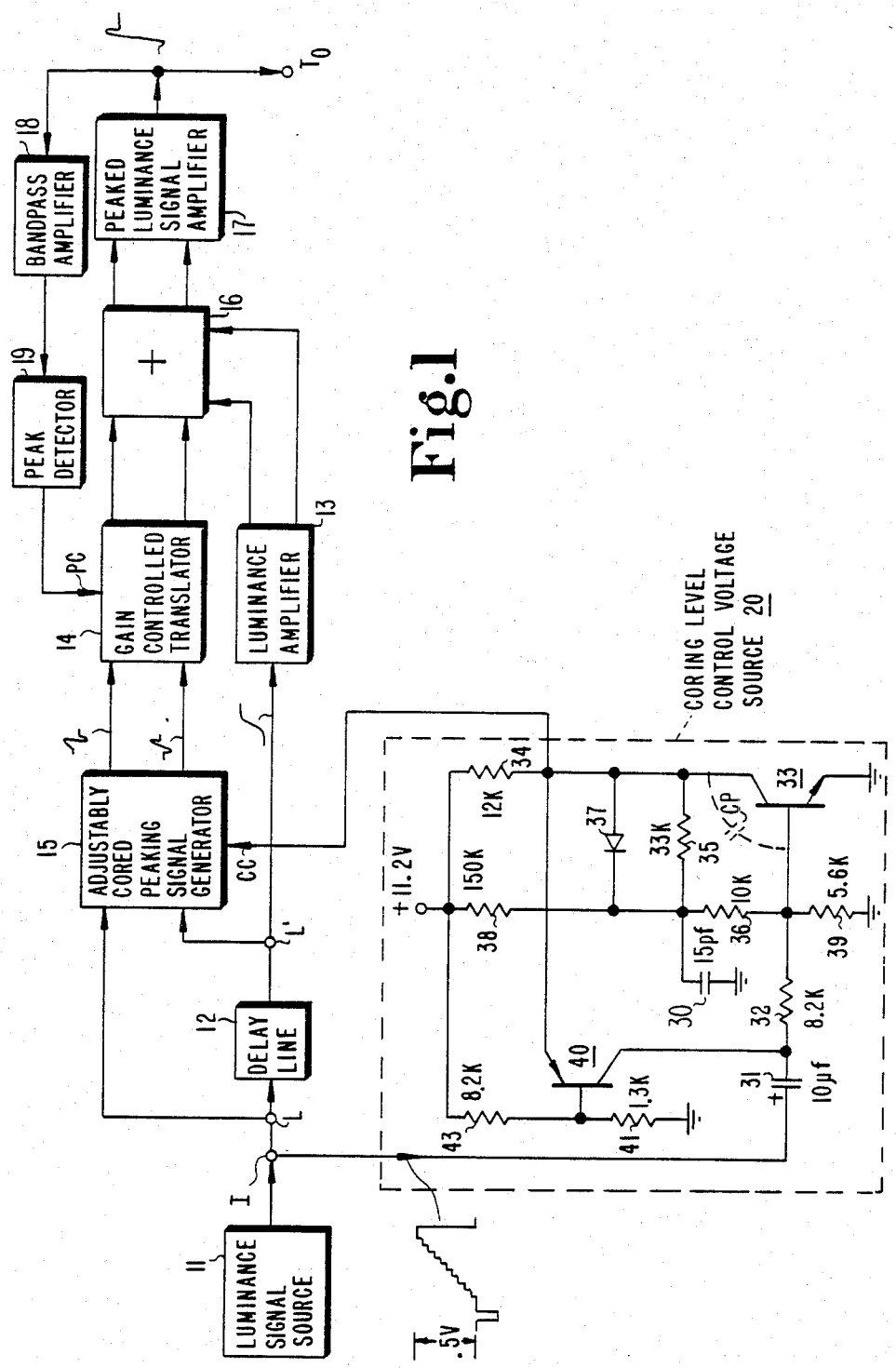
FIG. 1 shows a portion of a television receiver including signal coring apparatus and an associated coring control circuit according to the present invention.

In FIG. 1, luminance signals from a source 11 are coupled via a peaking system input terminal I to an input terminal L of a delay line 12. Signals appearing at terminal L, and signals appearing at output terminal L' of delay line 12, are supplied as inputs to an adjustably cored peaking signal generator 15 which may, for example, comprise apparatus of the type described in the aforementioned U.S. Pat. No. 4,441,121 of L. A. Harwood, et al.

With the input end of delay line 12 suitably terminated by an impedance substantially matching the characteristic impedance of the delay line, and with the output end of delay line 12 misterminated to obtain a reflective effect, the signal inputs to peaking generator 15 comprise a once-delayed luminance signal (from terminal L'), and the sum of an undelayed luminance signal and a twice delayed luminance signal (from terminal L). With the delay imparted by delay line 12 chosen to equal a half period at a selected frequency within the high frequency portion of the spectrum occupied by the luminance signal, the difference between the respective signals at terminals L and L' corresponds to an appropriate horizontal peaking signal for addition to the luminance signal to enhance its horizontal image detail. The peaking component of the luminance signal is representative of the high frequency content of the lumiance signal. Peaking signal generator 15 forms a peaking signal corresponding to such a signal difference subject, however, to removal of its close-to-axis core to a depth dependent upon the magnitude of a coring depth control voltage CC supplied to a control input of network 15. Coring control voltage CC is provided from a coring level control voltage source 20 as will be discussed.

Peaking generator 15 provides similar cored peaking signal outputs in push-pull (mutually inverted) form to a gain controlled signal translating network 14, which translates the cored peaking signals with a gain (or attenuation) determined by peaking control voltage PC. Push-pull signal outputs from translator 14 are summed in a combiner 16 with push-pull signal outputs of a luminance amplifier 13 which responds to delayed luminance signals from terminal L'. Push-pull versions of a peaked luminance signal from combiner 16 are applied to a peaked luminance signal amplifier 17, which converts the push-pull peaking luminance signal inputs to single-ended form at an output terminal $T_O$. Signals from terminal $T_O$ may be conveyed, for example, to matrix circuits of a color television receiver for combination with respective color difference signals to produce plural color image representative signals for application to a color image reproducing kinescope.

The output signal from amplifier 17 is also applied to the input of a bandpass amplifier 18 for automatic peaking control purposes. Amplifier 18 illustratively exhibits a passband of 1 MHz bandwidth centered about a frequency of approximately 2 MHz, and delivers the components of the peaked luminance signal falling within its passband to a peak detector 19. Peak detector 19 develops a peaking control voltage PC proportional to the amplitude of the delivered passband components, for controlling the magnitude of the peaking signals supplied to combiner 16 in a sense opposing changes in the amplitude of the delivered components. The operation of such an automatic peaking control system, and examples of circuits for implementing the functions of elements 13, 14, 16, 17, 18 and 19, are described in copending U.S. patent application Ser. No. 310,139 of L. A. Harwood, et al. filed Oct. 9, 1981, now U.S. Pat. No. 4,399,460.

Luminance signals appearing at input terminal I are also applied to an input of coring level control voltage source 20 shown in schematic circuit form. As indicated by the waveform, such input luminance signal illustratively comprises a negative-going sync pulse component followed by a positive-going image representative "staircase" component in a white-going direction. The depth of coring of the peaking signal output of peaking signal generator 15 is controlled in accordance with the amplitude of the low frequency content of luminance signals from source 11 after processing by coring control source 20 to develop coring control signal CC at the ouput of control source 20. For this purpose control source 20 comprises a low pass inverting amplifier as will be discussed. For the desired sense of dynamic coring control of the peaking signal from generator 15, the low pass filtered output signal CC from source 20 is such that a change in the output of source 20 in a black direction causes an increase in the coring depth, whereas a change in the output of source 20 in a white direction decreases the coring depth.

In accordance with the principles of the present invention, control source 20 exhibits a non-linear transfer characteristic wherein luminance signals are processed with one signal gain for luminance signals between the white image amplitude limit and a threshold amplitude level in the black direction, and another, different, signal gain for luminance signals between the threshold amplitude level and the black image amplitude limit. Accordingly, control signal CC from control source 20 exhibits a corresponding non-linear characteristic.

The input to control source 20 comprises luminance signals which illustratively exhibit a polarity, as indicated by the waveform, such that blacker-than-black deflection synchronizing pulse components thereof extend in a negative direction. Such luminance signals are coupled via a DC blocking capacitor 31 and a series resistor 32 to the base input of a transistor 33 arranged in a common emitter inverting amplifier configuration. An output load resistor 34 is coupled to the collector output of transistor 33, and a bias resistor 39 shunts the base-emitter path of transistor 33. Feedback between the collector and base electrodes of transistor 33 is provided via a bridged-T filter network formed by series resistors 35,36 a capacitor 30, and the collector-base parasitic capacitance $C_P$ of transistor 33. The filter network establishes a low-pass filter characteristic for amplifier transistor 33, with a $-3$ db cut-off frequency of approximately 1.0 MHz. Such low-pass characteristic substantially precludes ringing disturbances in coring control signal CC.

A diode 37 coupled across feedback resistor 35 in the collector-base circuit of transistor 33 assists to establish the non-linear gain characteristic of the translator circuit including transistor 33, between white and black image limits, as follows. A resistor 38 provides a bias current to the junction of feedback resistors 35 and 36, thereby establishing a threshold bias voltage for diode 37. Diode 37 is biased to be non-conductive (i.e., reverse biased) when the low pass filtered collector ouput signals of transistor 33 exhibit levels between the white limit and a threshold level situated between the white and black image limits. Diode 37 becomes increasingly forward biased and conductive in response to collector output signal levels of transistor 33 between the threshold level and the black limit, thereby modifying the gain of transistor 33. The effect produced by diode 37 is seen from the waveform shown in FIG. 2.

Figure 2:
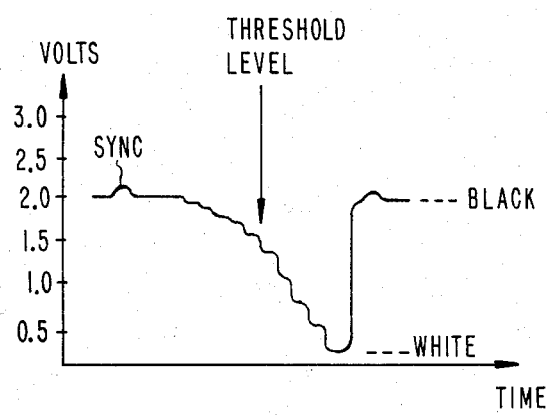
FIG. 2 depicts a signal waveform helpful in understanding the operation of the coring control circuit in FIG. 1.

The waveform of FIG. 2 corresponds to one horizontal image line of the luminance signal appearing at the signal inverting collector output of transistor 33. The illustrated luminance signal comprises a positive sync pulse component which occurs during image blanking intervals, and a following image interval component comprising a "staircase" signal between black (more positive) and white (less positive) image limits. Diode 37 in FIG. 1 remains non-conductive over a first range of signal levels between the white limit level and the threshold level, which illustratively corresponds to an approximately 30 IRE unit level of the luminance signal. Over this range of signal levels transistor 33 exhibits a first, relatively linear gain characteristic determined by the ratio of the sum of the values of resistors 35 and 36 to the value of resistor 32.

Diode 37 is increasingly forward biased to conduct over a second range of signal levels between the threshold level and the black image limit, thereby modifying the value of the feedback impedance and correspondingly modifying the gain of transistor 33. In the latter instance the signal gain of transistor 33 is reduced and output luminance signals are compressed due to the conduction of diode 37, which shunts feedback resistor 35. Diode 37 conducts in its non-linear "knee" region for most of the luminance signal level between the threshold level and the black limit, during which time diode 37 exhibits an offset voltage of between 0.0 volts and approximately +0.5 volts.

For signal levels in the blacker-than-black region, as encompassed by the positive sync pulse, diode 37 conducts heavily in a more linear region and effects a clipping action whereby the sync pulse is amplitude limited.

In accordance with the signal compressing action over the second range of signal levels, output coring control signal CC increasingly restricts the amount of coring imparted to the signal from peaking generator 15 as the black image limit is approached from the threshold level, compared to the relatively greater amount of black region coring which would otherwise result without such compression. It has been found that video signal processing in accordance with the above operation of control source 20 leads to reproduced video images which, particularly for dark scenes of less than about 30 IRE units, are perceived by viewers as having improved image detail. It has also been found that the effect of noise when present due to the restricted amount of signal coring for low level scenes is not objectionable and is overshadowed by the perceived increase in picture detail when signal coring is restricted as described for low level scenes. Observations have indicated that the described non-linear signal coring apparatus yields a better approximation of the sensitivity of a viewer's eye with respect to noise and picture detail for low level scenes.

Coring control voltage source 20 in FIG. 1 also includes a PNP transistor 40 which comprises a DC restoring input clamping network as described in detail in my copending U.S. patent application Ser. No. 373,531 filed Apr. 30, 1982, now U.S. Pat. No. 4,437,123, and entitled "Dynamically Controlled Horizontal Peaking System" now U.S. Pat. No. 4,437,123. Briefly, emitter input and collector output electrodes of transistor 40 are respectively coupled to the collector output circuit of transistor 33 and to input DC blocking capacitor 31. A reference bias voltage for transistor 40 is applied to the base of transistor 40 from a voltage divider network comprising resistors 41 and 43. Capacitor 31 isolates the circuitry comprising control source 20 from variations of the DC level at input terminal I. Clamping transistor 40 is periodically driven into conduction by the positive sync pulses appearing at the collector circuit of transistor 33. The charge on capacitor 31 is readjusted during these conduction periods such that sync pulse amplitude peaks as appearing at the output of control source 20 are clamped to a potential related to the reference potential determined by voltage divider resistors 41 and 43. The reference potential is selected so that output control signal CC from source 20 as developed in response to a black level input signal introduces a desired coring depth (e.g., 6%). Thus the clamping action assists to establish a desired coring depth for black scenes.

The amplitude of the sync pulse which renders clamp transistor 40 conductive can vary unpredictably for a variety of reasons, thereby varying the level of conduction of clamp transistor 40 and undesirably affecting the clamping action of transistor 40. However, clamping errors otherwise likely to be introduced by sync pulse amplitude variations are significantly reduced by the sync pulse limiting action produced by the signal compressing operation of the feedback amplifier including transistor 33, as discussed previously. Thus the black region compression and limiting function also assists to promote more accurate clamping and DC restoration and reduced coring error.

For optimum timing of the dynamic variations of the amount of coring, the overall delay in the control path including control source 20 should substantially match the delay of the once-delayed input signal to peaking signal generator 15, e.g., by selecting an appropriate delay characteristic for the low pass filter circuit of network 20.

Figure 3:
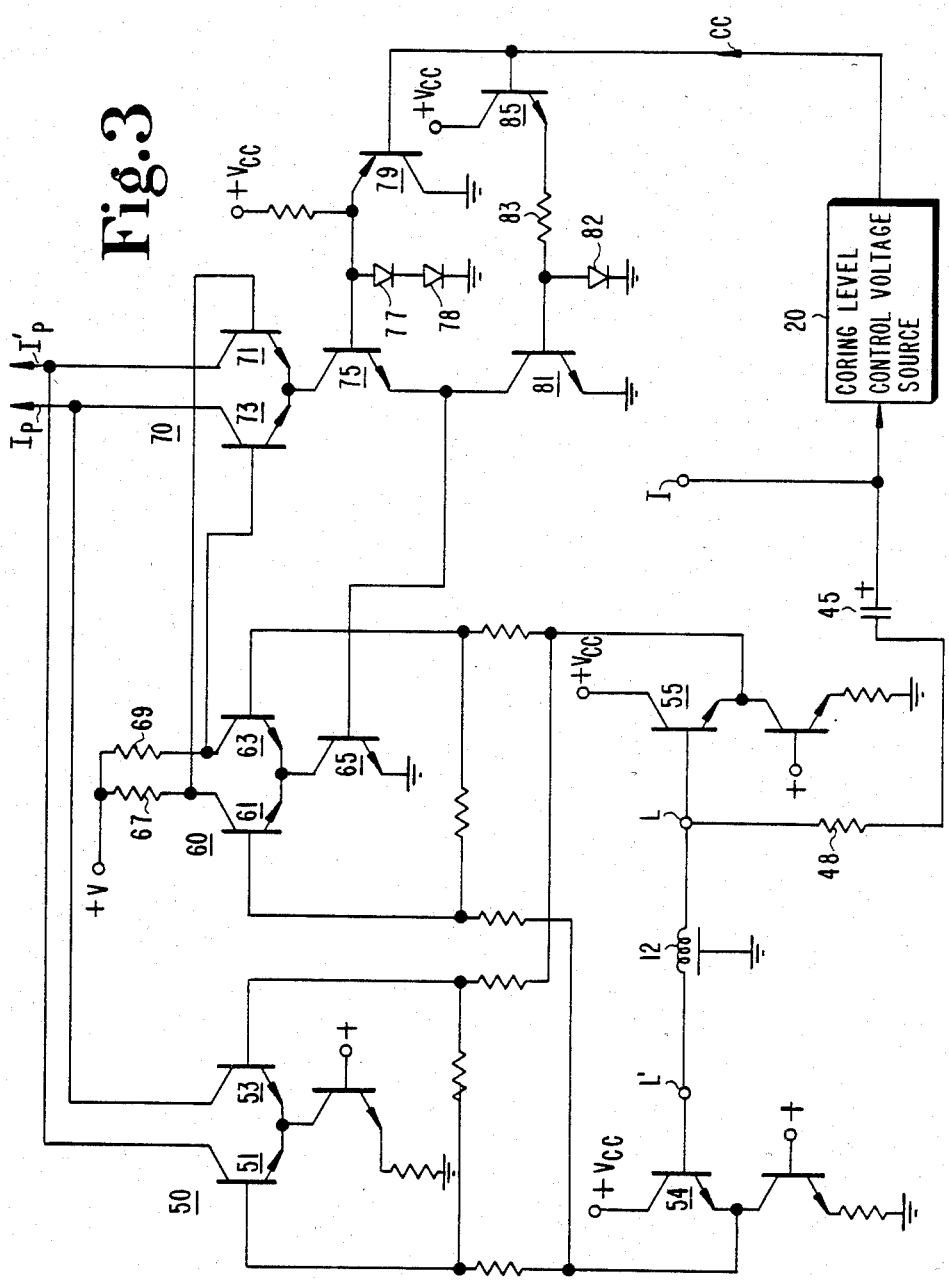
FIG. 3 shows additional circuit details of elements of the system illustrated in FIG. 1.

FIG. 3 illustrates a schematic circuit diagram of adjustably cored peaking signal generator 15 in FIG. 1, of the type disclosed in the aforementioned Harwood, et al. U.S. Pat. No. 4,441,121 together with delay line 12 and control source 20. Luminance signals from input terminal I are applied via a DC blocking capacitor 45 and a resistor 48 to input terminal L of delay line 12. Illustratively, delay line 12 is a wideband device exhibiting a linear phase characteristic over the frequency band occupied by the luminance signals (e.g., extending to 4.0 MHz.), and provides a signal delay of approximately 140 nanoseconds. The input end of delay line 12 at terminal L is terminated (e.g., through the aid of reistor 48) in an impedance substantially matching its characteristic impedance, whereas the output end of the delay line (at terminal L′) is misterminated to obtain a reflective effect. The signals appearing at the respective ends of delay line 12 are thus: (a) a once-delayed luminance signal at terminal L′, and (b) the sum of an undelayed luminance signal and a twice-delayed luminance signal at terminal L. The difference between the respective signals at terminals L and L′ corresponds to an appropriate horizontal peaking signal for addition to the luminance signal to enhance its horizontal detail by effectively boosting high frequency luminance components, with the maximum boost occurring at approximately 3.5 MHz.

The horizontal peaking signal is linearly amplified by a differential amplifier 50 comprising emitter coupled transistors 51,53 which respectively receive base input signals from delay line terminals L′ and L via emitter follower transistors 54 and 55. The respective collector electrodes of transistors 51 and 53 are coupled to an operating potential supply via respective loads (not shown) which are shared by the outputs of a limiting amplifier stage to be subsequently described. The respective collector currents of transistors 51 and 53 vary in accordance with oppositely phased versions of the peaking signal.

The horizontal peaking signal is non-linearly amplified by a clipping differential amplifier 60 comprising emitter coupled transistors 61,63 which respectively receive base input signals from delay line terminals L′ and L via emitter follower transistors 54 and 55. A transistor 65 serves as a current source for transistors 61 and 63. Differential amplifier 60 serves as the input stage of a limiting amplifier for the peaking signal. Oppositely phased peaking signals, with maximum excursions clipped beyond a predetermined threshold level, respectively appear across load resistors 67 and 69.

A differential amplifier 70, comprising emitter coupled transistors 71,73 serves as the output stage of the limiting amplifier and provides further clipping of the peaking signals. Base input electrodes of transistors 71 and 73 are respectively connected to the collector outputs of transistors 61,63 of the input stage. A transistor 75 serves as a current source for transistors 71 and 73. Collector output currents of transistors 71,73 of the limiter output stage are respectively combined with collector output currents of transistors 51,53 of the linear amplifier to produce oppositely phased cored peaking signal currents $I_p$ and $I_p'$.

A voltage developed across series connected forward biased diodes 77,78 is applied across the series connected base-emitter paths of current source transistors 75 and 65. The collector of a control transistor 81 is connected to the base of current source transistor 65, and has its collector-emitter current path shunting the base-emitter path of current source transistor 65.

Coring control signal CC from source 20 is applied via an emitter follower transistor 85 and a resistor 83 to the base input of control transistor 81, the base-emitter junction of which is shunted by a diode 82. Variations in the level of positive coring control signal CC vary the conductance of the collector-emitter path of transistor 81. Variable control signal CC is also applied to the base input of a PNP control transistor 79, the emitter output of which is coupled to the base input of current source transistor 75. The base-emitter junction of control transistor 79 is reverse biased over a substantial portion of the range of variations of coring control signal CC. Under such circumstances control transistor 79 has no effect on the operation of the adjustable coring circuit, which functions in a manner as described in the aforementioned Harwood, et al. U.S. Pat. No. 4,441,121 and as summarized immediately below.

The base-emitter path of transistor 75 forms a voltage divider with the parallel combination of (a) the base-emitter path of current source transistor 65, and (b) the collector-emitter path of control transistor 81, to effect a division of the bias voltage appearing across series diodes 77,78. The voltage division ratio is dependent upon the conductance of control transistor 81. When the shunting impedance presented by control transistor 81 decreases due to an increase in positive control signal CC, the base-emitter voltage of current source transistor 65 decreases, accompanied by a complementary increase in the base-emitter voltage of current source transistor 75. Conversely, the base-emitter junction voltages of transistors 65 and 75 respectively increase and decrease in a complementary manner when the level of coring control signal CC decreases.

Variations of coring control signal CC thus introduce complementary variations in the operating currents of cascaded differential amplifier stages 60 and 70, with associated complementary variations of the respective gains of the two cascaded stages of the limiting amplifier. With variations of the DC impedance presented by control transistor 81 having a negligible effect on the bias voltage appearing across diodes 77,78, the overall gain of the limiting amplifier, which is proportional to the product of the magnitudes of the operating currents of stages 60 and 70, remains undisturbed as the distribution of gain between stages 60 and 70 is varied. For accuracy of coring, this undisturbed magnitude of overall gain is set so that the gain of the linear amplification channel comprising amplifier 50, and the gain of the non-linear amplification channel comprising limiting stages 60 and 70, are substantially identical.

The amount of coring is reduced in response to a decrease in the level of coring control signal CC, which increases the gain of input stage 60 and results in output stage 70 signal clipping closer to the signal axis. Conversely, the amount of coring is increased in response to an increase in the level of control signal CC, which decreases the gain of input stage 60 and results in output stage 70 clipping further away from the signal axis.

The role performed by PNP control transistor 79 is confined to the end of the coring control range associated with a minimum coring level, as explained, for example, in a copending U.S. patent application Ser. No. 460,846 of R. L. Shanley titled "Adjustable Coring Circuit Permitting Coring Extinction", filed Jan. 25, 1983, now U.S. Pat. No. 4,438,454 (a continuation-in-part of patent application Ser. No. 363,856 filed Mar. 31, 1982 now Abandoned). When the magnitude of coring control signal CC falls sufficiently close to ground potential, the biasing of the base-emitter junction of PNP control transistor 79 changes such that transistor 79 becomes forward biased to conduct. For levels of control signal CC below approximately +0.7 volts, transistor 79 is rendered conductive, and for levels of control signal CC below approximately +0.5 volts, the conduction by transistor 79 is sufficient to drive current source transistors 75 and 65 into cutoff, thereby disabling the limiting amplifier stage and fully extinguishing coring action. The adjustable coring circuit is thereby provided with a zero coring level for one extreme of the coring control range.

Additional information concerning the operation of adjustably cored peaking signal generator 15 as shown in FIG. 3 is found in the aforementioned U.S. Pat. No. 4,437,124 of L. Cochran.

What is claimed is:

1. In a video signal processing system including a source of video signals representative of image content between dark and bright extremes, a dynamic signal coring circuit comprising:

means, coupled to said source, for developing a cored version of a signal representative of the high frequency content of said video signals in response to a coring control signal applied to a control input of said developing means; and control means, with an input coupled to said source and an output coupled to said control input of said developing means, for providing to said control input a control signal in accordance with the magnitude of video signals from said source, said control signal exhibiting a sense for causing said developing means to produce a greater amount of coring for video signals representative of dark image content than for video signals representative of bright image content; wherein said control means comprises signal translating means responsive to video signals from said source and exhibiting a non-linear control characteristic for producing at an output thereof said control signal with one control characteristic over a first range of video signal levels betwen a bright image extreme and a threshold level in the direction of a dark image extreme, and a different control characteristic over a second range of video signal levels between said threshold level and said dark image extreme for restricting the amount of coring produced as said dark image extreme is approached.

2. A circuit according to claim 1, wherein said translating means includes means for compressing the amplitude of said output control signal over said second range.

3. A circuit according to claim 1, wherein said translating means exhibits a low pass transfer characteristic.

4. A circuit according to claim 2, wherein said translating means comprises an amplifier with a feedback network associated therewith for determining the gain of said amplifier; and a threshold conduction device is coupled to said feedback network, said threshold device exhibiting one conductive state for producing one amplifier gain over said first range of video signal levels, and exhibiting another conductive state for producing a different amplifier gain over said second range of video signal levels.

5. In a television receiver including a source of video signals representative of variations of the luminance of an image between dark and bright image extremes, a dynamically controlled horizontal image peaking system comprising:

means, responsive to said video signals, for generating an adjustably cored horizontal peaking signal output; said generating means providing coring of said horizontal peaking signal in an amount dependent upon the magnitude of a coring control signal applied to a control input of said generating means; and control means having a low-pass transfer characteristic with an input coupled to said video signal source and an output coupled to said control input of said generating means for providing thereto a coring control signal with a control characteristic for causing greater coring of said peaking signal for luminance signals with dark image content and relatively less coring for luminance signals with bright image content; wherein said control means exhibits a non-linear control characteristic for producing said control signal with one control characteristic over a first range of video signal levels between a bright image extreme and a threshold level in the direction of a black image extreme, and a different control characteristic over a second range of video signal levels between said threshold level and said dark image extreme for restricting the amount of coring produced as said dark image extreme is approached.

6. A system according to claim 5, wherein said control means includes means for compressing the amplitude of said output control signal over said second range.

* * * * *